(12) United States Patent
Harada et al.

(10) Patent No.: US 12,313,121 B2
(45) Date of Patent: May 27, 2025

(54) SLIDING MEMBER

(71) Applicant: DAIDO METAL COMPANY LTD., Aichi (JP)

(72) Inventors: Hideyuki Harada, Inuyama (JP); Kentaro Tsujimoto, Inuyama (JP); Yuma Haneda, Inuyama (JP); Yuhei Maegawa, Inuyama (JP)

(73) Assignee: DAIDO METAL COMPANY LTD., Aichi (JP)

( * ) Notice: Subject to any disclaimer, the term of this patent is extended or adjusted under 35 U.S.C. 154(b) by 0 days.

(21) Appl. No.: 18/583,374

(22) Filed: Feb. 21, 2024

(65) Prior Publication Data

US 2024/0318687 A1 Sep. 26, 2024

(51) Int. Cl.
*B32B 15/01* (2006.01)
*F16C 33/12* (2006.01)

(52) U.S. Cl.
CPC ............ *F16C 33/121* (2013.01); *B32B 15/01* (2013.01)

(58) Field of Classification Search
None
See application file for complete search history.

(56) References Cited

U.S. PATENT DOCUMENTS

2009/0214887 A1* 8/2009 Fujita .................. F16C 33/14
428/610

FOREIGN PATENT DOCUMENTS

| JP | 2009203504 A | 9/2009 |
|---|---|---|
| WO | 2012067735 A1 | 5/2012 |

OTHER PUBLICATIONS

Extended European Search Report dated Jul. 31, 2024, for European Patent Application No. 24159914.1.

* cited by examiner

*Primary Examiner* — Elizabeth Collister
(74) *Attorney, Agent, or Firm* — KARCESKI IP LAW, PLLC (57) ABSTRACT

A sliding member of the present embodiment includes: a lining layer including a Bi phase; and a coating layer containing Ni, the coating layer being provided on a surface of the lining layer, the coating layer partially forming an entrance portion that has entered the lining layer side at an interface with respect to the lining layer. At any observation region including the interface between the lining layer and the coating layer, a value R=S1/S2 of a ratio of a maximum area S1 of the Bi phase included in the lining layer to a maximum area S2 of the entrance portion that has entered the lining layer is 1.00≤R≤9.00.

4 Claims, 7 Drawing Sheets

|  | S1/S2 | RESULT |
|---|---|---|
| EXAMPLE 1 | 1.0 | CLASSIFICATION 2 |
| EXAMPLE 2 | 5.0 | CLASSIFICATION 2 |
| EXAMPLE 3 | 9.0 | CLASSIFICATION 2 |
| COMPARATIVE EXAMPLE 1 | 9.5 | CLASSIFICATION 3 |

Fig.5

|  | S1 ($\mu m^2$) | S1/S2 | RESULT |
|---|---|---|---|
| EXAMPLE 4 | 20 | 5.0 | CLASSIFICATION 0 |
| EXAMPLE 5 | 400 | 5.0 | CLASSIFICATION 1 |
| EXAMPLE 6 | 810 | 5.0 | CLASSIFICATION 1 |
| EXAMPLE 7 | 830 | 5.0 | CLASSIFICATION 2 |

Fig.6

|  | S2 ($\mu m^2$) | S1/S2 | RESULT |
|---|---|---|---|
| EXAMPLE 8 | 20 | 5.0 | CLASSIFICATION 0 |
| EXAMPLE 9 | 40 | 5.0 | CLASSIFICATION 1 |
| EXAMPLE 10 | 90 | 5.0 | CLASSIFICATION 1 |
| EXAMPLE 11 | 95 | 5.0 | CLASSIFICATION 2 |

Fig.7

|  | Bi Concentration C (mass%) | S1/S2 | RESULT |
|---|---|---|---|
| EXAMPLE 12 | 0.1 | 5.0 | CLASSIFICATION 0 |
| EXAMPLE 13 | 0.5 | 5.0 | CLASSIFICATION 0 |
| EXAMPLE 14 | 1.0 | 5.0 | CLASSIFICATION 0 |
| EXAMPLE 15 | 1.5 | 5.0 | CLASSIFICATION 1 |
| EXAMPLE 16 | 2.0 | 5.0 | CLASSIFICATION 2 |

SLIDING MEMBER

CROSS-REFERENCE TO RELATED APPLICATION(S)

This application relies on and claims priority to Japanese Patent Application No. 2023-048474, filed on Mar. 24, 2023, the entire contents of which are incorporated herein by reference.

FIELD OF THE INVENTION

The present embodiment relates to a sliding member.

BACKGROUND OF THE INVENTION

Hitherto, there is publicly known a sliding member in which an overlay layer is provided on a surface of a Cu-based lining layer (Japanese Patent Laid-Open No. 2009-203504). In Japanese Patent Laid-Open No. 2009-203504, a second phase composition included in the lining layer is removed from a surface of the lining layer so that a bonding strength between the lining layer and the overlay layer is improved. Further, it is disclosed that, in order to stabilize the overlay layer, a coating layer of Ni is provided on the surface of the lining layer.

However, Bi being the second phase composition included in the lining layer generates a Bi—Ni compound at an interface with respect to the coating layer, depending on a temperature condition at the time of operation of an applied apparatus. This Bi—Ni compound causes reduction in adhesive strength between the lining layer and the coating layer. Accordingly, when a configuration as that in Japanese Patent Laid-Open No. 2009-203504 is adopted, it is required to completely remove a Bi phase present on a surface of the lining layer, that is, a surface brought into contact with the coating layer. Such removal of the Bi phase requires long-term cleaning such as cleaning using an acid and ultrasonic cleaning of applying ultrasonic waves, and also requires a large amount of man-hours, which has been a problem.

In view of the above, the present embodiment has an object to provide a sliding member with which an adhesive strength between a lining layer and a coating layer is improved, while man-hours for removing Bi are reduced.

SUMMARY OF THE INVENTION

In order to achieve the above-mentioned object, a sliding member of the present embodiment includes: a lining layer including a Bi phase; and a coating layer containing Ni, the coating layer being provided on a surface of the lining layer, the coating layer partially forming an entrance portion that has entered the lining layer side at an interface with respect to the lining layer. At any observation region including the interface between the lining layer and the coating layer, a value R=S1/S2 of a ratio of a maximum area S1 of the Bi phase included in the lining layer to a maximum area S2 of the entrance portion that has entered the lining layer is 1.00≤R≤9.00.

In the sliding member of the present embodiment, the value R of the ratio of the maximum area S1 of the Bi phase to the maximum area S2 of the entrance portion is set. When the Bi phase is removed by cleaning or other methods, a recessed portion corresponding to the removed Bi phase is formed in the lining layer. Accordingly, this recessed portion corresponding to the removed Bi phase is replaced with Ni or an Ni alloy forming the coating layer. In this manner, generation of a Bi—Ni compound is reduced. Further, even when a part of the Bi phases remains in the lining layer, Ni or the Ni alloy enters the recessed portion formed through the removal of the Bi phase as the entrance portion. Accordingly, the entrance portion that has entered the recessed portion is in a state of biting into the lining layer. As a result, the coating layer is in a state of being caught to the lining layer in a predetermined shape, resulting in reduction of peeling from the lining layer even when the Bi—Ni compound is formed. From those facts, even when the cleaning of the Bi phase included in the lining layer is insufficient, the bonding strength between the lining layer and the coating layer is ensured. Thus, while the man-hours for removing Bi are reduced, the adhesive strength between the lining layer and the coating layer can be improved.

DESCRIPTION OF EMBODIMENT(S) OF THE INVENTION

A sliding member according to one embodiment is hereinafter described with reference to the drawings.

Figure 1:
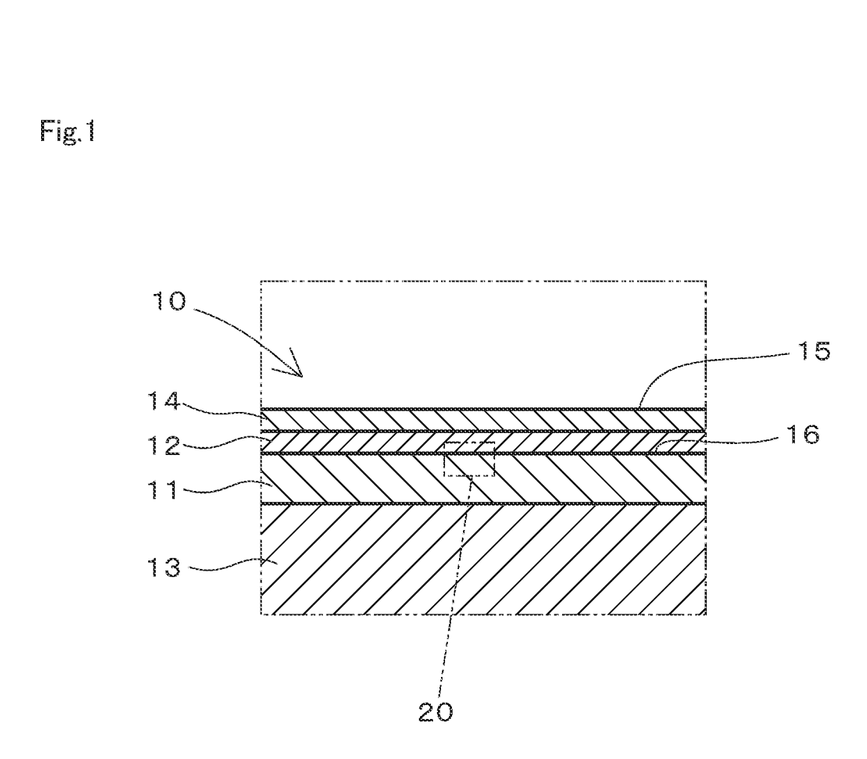
FIG. 1 is a schematic view showing a cross section of a sliding member according to one embodiment.

As shown in FIG. 1, a sliding member 10 includes a lining layer 11 and a coating layer 12. The sliding member 10 is formed into, for example, a cylindrical shape or a half-split shape, and is used for a bearing device or the like. The lining layer 11 is provided on one end surface of a back metal layer 13. Further, the sliding member 10 further includes an overlay layer 14 on a side of the coating layer 12 opposite to the back metal layer 13. That is, the coating layer 12 is an intermediate layer provided between the lining layer 11 and the overlay layer 14. A surface of the overlay layer 14 forms a sliding surface 15 that slides with respect to a counter member (not shown). It should be noted that the sliding member 10 is not limited to a cylindrical half-split shape divided in half, and may be obtained through division into three or more parts in a circumferential direction.

The lining layer 11 is formed of a Cu-based alloy. The lining layer 11 contains Cu as a main component, and also contains Bi. The lining layer 11 contains Bi of 0.1 mass % to 2.0 mass %. Bi contributes to, for example, improvement of processability at the time of mechanical processing such as cutting and polishing of the formed lining layer 11. The lining layer 11 is not limited to a Cu-based alloy, and may be a Sn-based alloy or an Al-based alloy. The thickness of the overlay layer is preferred to be set to 10 μm to 30 μm. In the case of the lining layer 11, the thickness is preferred to be set to 0.1 mm to 1.5 mm. In this case, the thickness of the coating layer 12 is preferred to be set to 1 µm to 5 µm.

The coating layer 12 is formed of Ni. The coating layer 12 may be a Ni alloy. In this case, in the coating layer 12, Ni may contain Cr or other elements of 30 mass % or less. The coating layer 12 is formed by, for example, plating on the surface of the lining layer 11 on the side opposite to the back metal layer 13. A boundary between the lining layer 11 and the coating layer 12 is an interface 16. The back metal layer 13 is formed of an alloy containing Fe as a main component, such as steel. Between the lining layer 11 and the back metal layer 13, one or more layers such as intermediate layers (not shown) may be provided. The overlay layer 14 is formed of, for example, Sn or an alloy containing Sn as a main component. It should be noted that the overlay layer 14 may be other elements or alloys thereof instead of Sn or a Sn-based alloy.

Figure 2:
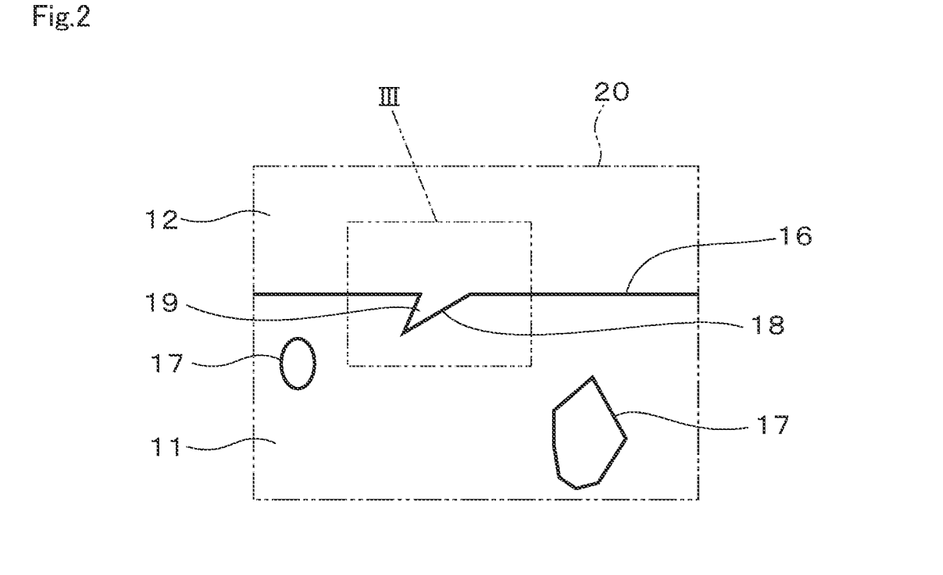
FIG. 2 is a schematic view in which an observation region of FIG. 1 is enlarged.

The lining layer 11 includes, in its structure, Bi phases 17 derived from Bi added to the Cu-based alloy as shown in FIG. 2. Some Bi phases 17 are included in the structure of the Cu-based alloy, and some are exposed at the interface 16. After the lining layer 11 is formed on the surface of the back metal layer 13, the lining layer 11 is cleaned by using, for example, an acid or water. In this manner, among the Bi phases 17 included in the lining layer 11, most of the Bi phases 17 exposed at the interface 16 are removed by cleaning. The interface 16 between the lining layer 11 and the coating layer 12 is preferred to be formed substantially flat. However, this interface 16 is not limited to be flat. When the Bi phase 17 is removed at the interface 16 of the lining layer 11, a part in which this Bi phase 17 is removed forms a recessed portion 18 that is dent to the lining layer 11 side. When the coating layer 12 of Ni or a Ni alloy is formed by, for example, plating at the interface 16 including this recessed portion 18, a part of Ni or the Ni alloy forming the coating layer 12 enters the recessed portion 18 of the lining layer 11. That is, the recessed portion 18 formed through removal of the Bi phase 17 at the interface 16 is filled with Ni or the Ni alloy forming the coating layer 12. In this manner, the coating layer 12 partially forms, at the interface 16 with respect to the lining layer 11, an entrance portion 19 that has entered the lining layer 11 side. This entrance portion 19 bites to the inner side of the lining layer 11 on the back metal layer 13 side with respect to the interface 16 between the lining layer 11 and the coating layer 12.

In the present embodiment, in any observation region 20 shown in FIG. 1 and FIG. 2, a maximum area S1 of the Bi phase 17 included in the lining layer 11 and a maximum area S2 of the entrance portion 19 that has entered the lining layer 11 are measured. A value R of a ratio is calculated as R=S1/S2 through use of the measured maximum area S1 and maximum area S2. The observation region 20 is set as, in the case of the present embodiment, any range including the entrance portion 19 in a cross section including the interface 16 between the lining layer 11 and the coating layer 12. The dimension of the observation region 20 is set as, for example, a range of 450 µm (thickness direction)×600 µm (width). It should be noted that this dimension of the observation region 20 is exemplary, and can be set to any dimension in a range in which the entrance portion 19 can be observed.

The maximum area S1 of the Bi phase 17 included in the lining layer 11 is an area of a Bi phase having the maximum area among the Bi phases 17 included in this observation region 20. Regarding the area of the Bi phase 17, there is a correlation between an area of a particle that may have been present at the interface and an area of a particle included on the inner side of the lining layer 11. In this case, the maximum area S1 of the Bi phase 17 is measured based on the particle of the Bi phase 17 included on the inner side of the lining layer 11. For example, when the observation region 20 includes a plurality of particles of the Bi phases 17 as shown in FIG. 2, the area of the Bi phase 17 having the maximum area is the maximum area S1. The observation region 20 is a cross section cut along the thickness direction, such as a direction along an axis of the sliding member 10 or a direction perpendicular to the axis, and can be set in any direction within a range in which the entrance portion 19 can be observed. Further, in this case, the observation region 20 is set so that, as 450 µm (thickness direction)×600 µm (width) described above, as compared to a length in the thickness direction of the lining layer 11, a length in a width direction perpendicular thereto is larger.

Figure 3:
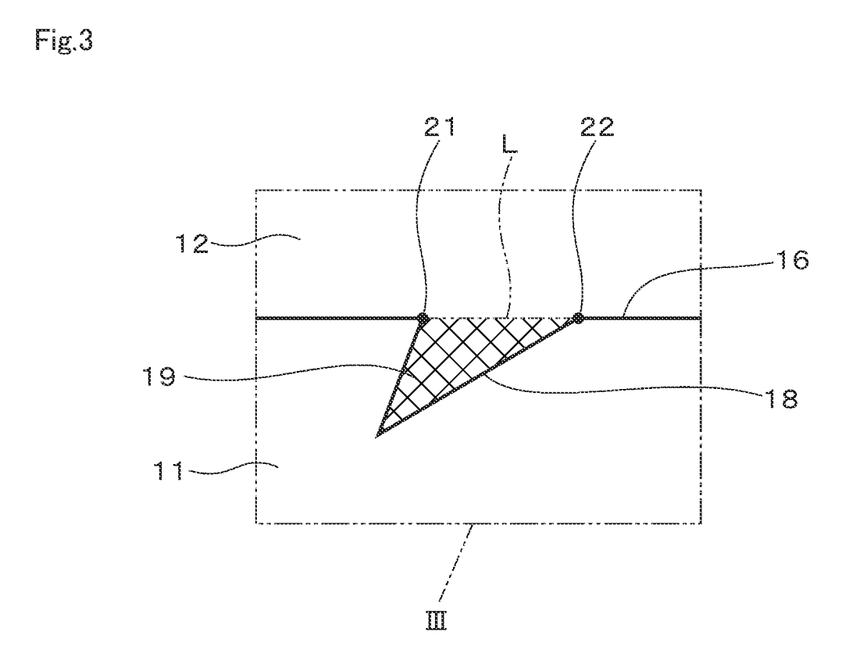
FIG. 3 is a schematic view in which a part III of FIG. 2 is enlarged.

The entrance portion 19 is defined as follows. As shown in FIG. 3, vertices 21 and 22 on the interface 16 side of the entrance portion 19 are connected to each other by an imaginary straight line L, and the entrance portion 19 is defined as a region on the lining layer 11 side with respect to this straight line L. That is, the entrance portion 19 is a cross-hatched region in FIG. 3. In addition, an area of the region on the lining layer 11 side with respect to this straight line L is an area of the entrance portion 19. When a plurality of entrance portions 19 are observed in the observation region 20 as shown in FIG. 2, an area of the entrance portion 19 having the maximum area among those entrance portions 19 is the maximum area S2. The value R of the ratio is calculated from the maximum area S1 and the maximum area S2 obtained as described above. In the present embodiment, the value R of the ratio is $1.00 \leq R \leq 9.00$.

The Bi phase 17 included in the lining layer 11 is preferred to have the maximum area S1 of $S1 \leq 810$ µm². When the maximum area of the Bi phase 17 is set as described above, the adhesive strength between the lining layer and the coating layer is further improved. Further, the Bi phase 17 is necessary for improvement of processability at the time of processing such as cutting of the lining layer 11. Thus, from the viewpoint of ensuring the processability of the lining layer 11, the maximum area S1 of the Bi phase 17 is preferred to be $20$ µm² $\leq S1$. The maximum area S1 of the Bi phase 17 included in the lining layer 11 is preferred to be $S1 \leq 810$ µm². The maximum area S2 of the entrance portion 19 is preferred to be $20$ µm² $\leq S2 \leq 90$ µm². When the maximum area S1 of the Bi phase 17 is set as described above, both of improvement of the processability at the time of processing such as cutting of the lining layer 11 and improvement of the adhesive strength with respect to the coating layer 12 can be achieved.

In a case where the coating layer 12 containing Ni is formed on the surface of the lining layer 11, when Bi 17 added to the lining layer 11 is exposed to the coating layer 12, Bi of the Bi phase 17 is diffused to the coating layer 12. For example, when the temperature of the sliding member 10 is 100° C. to 250° C., among the Bi phases 17 included in the lining layer 11, Bi in contact with the coating layer 12 at the interface 16 is diffused to the coating layer 12 side. Accordingly, at the vicinity of the interface 16, a Bi—Ni compound is likely to be generated from Bi derived from the lining layer 11 and Ni derived from the coating layer 12. This Bi—Ni compound reduces the adhesive strength between the lining layer 11 and the coating layer 12. Thus, in a conventional case, the interface 16 of the lining layer 11 requires complete and advanced cleaning with a large amount of man-hours in order to remove substantially the entire amount of Bi phases to avoid remaining of the Bi phase 17.

In contrast, in the present embodiment, the interface 16 of the lining layer 11 is cleaned, but the conventional advanced cleaning is unrequired. In the case of the present embodiment, the Bi phase 17 exposed at the interface 16 is mostly removed by, for example, simple cleaning using an acid. In addition, the lining layer 11 forms the recessed portion 18 at the interface 16 when the Bi phase 17 is removed at the interface 16. The coating layer 12 laminated on the lining layer 11 enters the recessed portion 18 formed in the lining layer 11 to form the entrance portion 19. In this manner, the formed coating layer 12 is in a state in which the entrance portion 19 enters and bites the lining layer 11. In the present embodiment, the value R of the ratio is set to $1.00 \leq R \leq 9.00$. In this manner, even when the unremoved Bi phase 17 remains in the recessed portion 18, the entrance portion 19 that has entered the lining layer 11 sufficiently bites the lining layer 11, resulting in improvement of a strength, that is, an adhesive strength at the interface 16 between the lining layer 11 and the coating layer 12. Thus, while the man-hours for removing the Bi phase 17 are reduced, the adhesive strength between the lining layer 11 and the coating layer 12 can be improved.

Next, a manufacturing method for the sliding member 10 of the present embodiment is described.

In the lining layer 11, the Bi phases 17 are finely dispersed in the Cu-based alloy. Such a lining layer 11 is formed by using, for example, sintering. Sintering is performed by mixing bronze powder that becomes a main component of the Cu-based alloy that forms the lining layer 11, with powder of Bi that forms the Bi phases 17. The size of the particle of the Bi phase 17 in the lining layer 11 is controlled by changing the grain size of the Bi powder used as the material. The size of the particle of the Bi phase is adjusted by, for example, blending particles classified by grain sizes such as 75 μm or less and 38 μm or less.

In primary sintering of sintering those mixed powders, a sintering temperature is set to 600° C. to 800° C. which is about ⅘ of the conventional sintering temperature. In this manner, the primary sintering of the powders allows coupling of powders in relatively fine neck formation, and the Cu-based lining layer 11 becomes porous. As a result, the particles of the Bi phases 17 included in the lining layer 11 after the primary sintering are present in a finely dispersed state in porous parts of the lining layer 11. After that, post-processing such as rolling is performed so that the lining layer 11 is formed.

The lining layer 11 subjected to the post-processing is cleaned with an acid for the purpose of removing an oxide coating at the interface 16. In this manner, the Bi phase 17 included in the lining layer 11 is removed before Cu being the main component of the lining layer 11 because of the difference in ionization tendency. A part in which the Bi phase 17 is removed at the interface 16 forms the recessed portion 18. The lining layer 11 cleaned with an acid is washed with water or the like, and then the coating layer 12 is formed thereon. The coating layer 12 is formed by, for example, plating of Ni or an Ni alloy. In the case of the present embodiment, the lining layer 11 is not subjected to strict cleaning other than the cleaning using an acid and water. That is, in the lining layer 11 of the present embodiment, a small amount of Bi may remain in the recessed portion 18 or other portions. The coating layer 12 formed by plating or other methods partially enters the recessed portion 18. In this manner, the coating layer 12 forms the entrance portion 19 that has entered the lining layer 11 side.

Description is hereinafter given of Examples of the sliding member 10 of the present embodiment.

In Examples and Comparative Example, the sliding member 10 was evaluated based on the adhesive strength between the lining layer 11 and the coating layer 12. The evaluation of the adhesive strength was performed through cross-cut evaluation defined in "JIS K5600-5-6" for evaluating the adhesive strength of plating. Conditions of heating temperature and time set before execution of the cross-cut evaluation based on this standard are strict evaluation conditions, and hence "classification 0," "classification 1," and "classification 2" were set as "pass." Test pieces of Examples and Comparative Example were created based on the above-mentioned manufacturing method, were then subjected to heating of 500 hr at 150° C. in order to reproduce the usage conditions, and then evaluated in adhesive strength.

Figure 4:
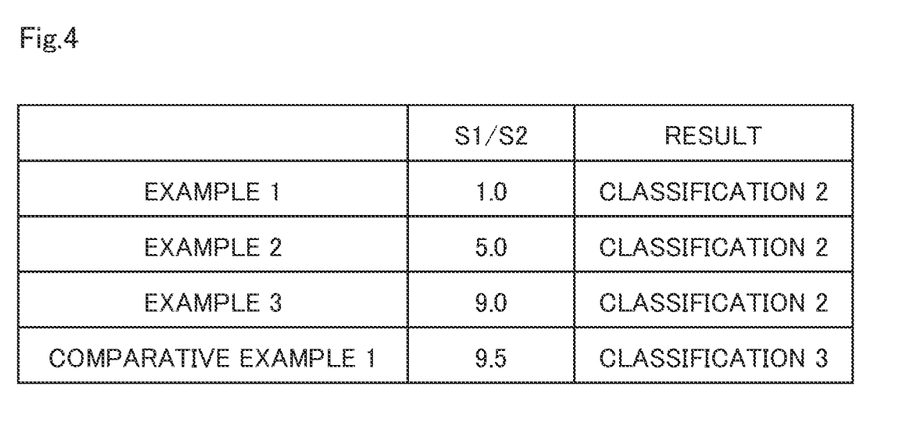
FIG. 4 is a schematic table showing evaluation results of Examples and Comparative Example of the sliding member according to the one embodiment.

FIG. 4 shows evaluations of effects to be applied by the value R of the ratio to the adhesive strength. In all of Example 1 to Example 3 and Comparative Example 1, a concentration C of Bi included in the lining layer 11 is set to 2.0 mass %. It is understood that, as in Example 1 to Example 3, when the value R of the ratio falls within the range of $1.00 \leq R \leq 9.00$, "classification 2" is obtained, and the value R of the ratio does not affect the adhesive strength. Meanwhile, it is understood that Comparative Example 1 having the value R of the ratio larger than 9.00 becomes "classification 3," and the adhesive strength is reduced. The lower limit of the value R of the ratio is set to 1.00 in consideration of the processability, particularly, the machinability of the sliding member 10.

Figure 5:
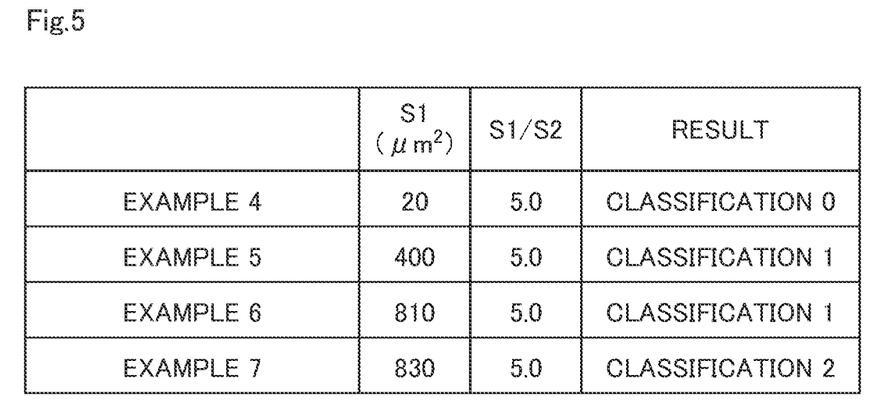
FIG. 5 is a schematic table showing evaluation results of Examples of the sliding member according to the one embodiment.

FIG. 5 shows evaluation of effects to be applied by the maximum area S1 of the Bi phase 17 to the adhesive strength. In all of Example 4 to Example 7, the concentration C of Bi included in the lining layer 11 is set to 2.0 mass %. Example 4 to Example 7 show that, when the value R of the ratio is constant, the adhesive strength is higher as the maximum area S1 of the Bi phase 17 is smaller. However, as described above, excessively small maximum area S1 of the Bi phase 17 affects the processability of the lining layer 11. Accordingly, the maximum area S1 of the Bi phase 17 is preferred to be 20 μm² or more.

Figure 6:
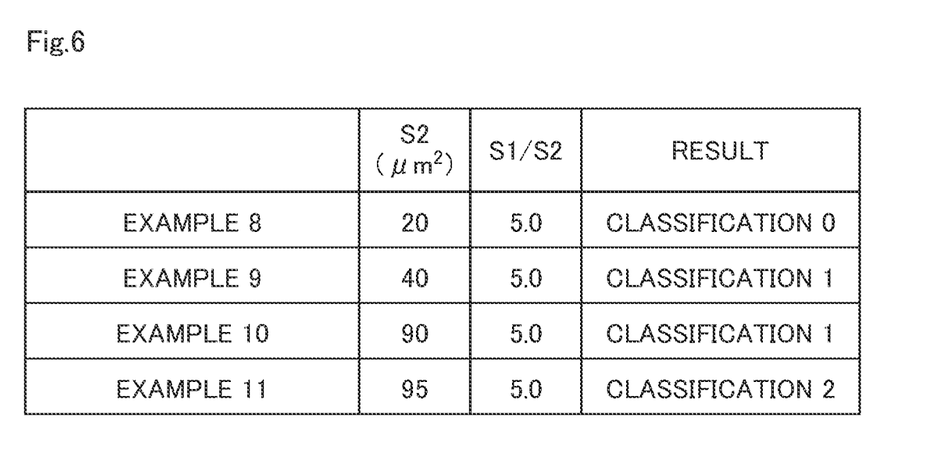
FIG. 6 is a schematic table showing evaluation results of Examples of the sliding member according to the one embodiment.

FIG. 6 shows evaluation of effects to be applied by the maximum area S2 of the entrance portion 19 to the adhesive strength. In all of Example 8 to Example 11, the concentration C of Bi included in the lining layer 11 is set to 2.0 mass %. Example 8 to Example 11 show that, when the value R of the ratio is constant, the adhesive strength is higher as the maximum area S2 of the entrance portion 19 is smaller.

Figure 7:
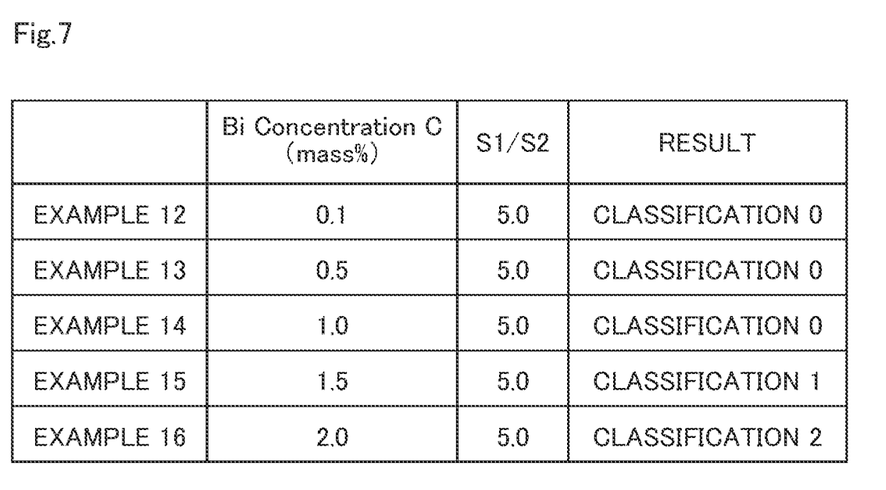
FIG. 7 is a schematic table showing evaluation results of Examples of the sliding member according to the one embodiment.

FIG. 7 shows evaluation of effects to be applied by the concentration C of Bi added to the lining layer 11 to the adhesive strength. FIG. 7 shows that, when the value R of the ratio is constant, the adhesive strength is higher as the concentration C is lower. However, as described above, the concentration of Bi affects the processability of the lining layer 11. Accordingly, on the premise that Bi is added to the lining layer 11, the lower limit value is set to 0.1 mass % from the viewpoint of practical use.

The present invention described above is not limited to the above-mentioned embodiment, and is applicable to various embodiments without departing from the gist thereof.

What is claimed is:
1. A sliding member comprising:
a lining layer including a Bi phase; and a coating layer containing Ni, the coating layer being provided on a surface of the lining layer, the coating layer partially forming an entrance portion that has entered the lining layer side at an interface with respect to the lining layer, wherein, at any observation region including the entrance portion at the interface between the lining layer and the coating layer, a value $R=S1/S2$ of a ratio of a maximum area $S1$ of the Bi phase included in the lining layer to a maximum area $S2$ of the entrance portion that has entered the lining layer is $1.00 \leq R \leq 9.00$.

2. The sliding member according to claim 1, wherein the maximum area $S1$ of the Bi phase is $S1 \leq 810 \ \mu m^2$.

3. The sliding member according to claim 1, wherein the maximum area $S2$ of the entrance portion is $20 \ \mu m^2 \leq S2 \leq 90 \ \mu m^2$.

4. The sliding member according to claim 1, wherein a concentration $C$ of Bi included in the lining layer is $0.1$ mass $\% \leq C \leq 1.5$ mass $\%$.

* * * * *